United States Patent
Reich et al.

(10) Patent No.: US 10,838,409 B2
(45) Date of Patent: Nov. 17, 2020

(54) VALVE CONTROL DEVICE AND SYSTEM

(71) Applicant: Festo SE & Co. KG, Esslingen (DE)

(72) Inventors: Jan Reich, Filderstadt (DE); Bernd Beuth, Goppingen (DE)

(73) Assignee: FESTO SE & Co. KG, Esslingen (DE)

( * ) Notice: Subject to any disclaimer, the term of this patent is extended or adjusted under 35 U.S.C. 154(b) by 116 days.

(21) Appl. No.: 16/112,949

(22) Filed: Aug. 27, 2018

(65) Prior Publication Data
US 2019/0072936 A1    Mar. 7, 2019

(30) Foreign Application Priority Data
Sep. 1, 2017   (DE) .................. 10 2017 215 350

(51) Int. Cl.
*G05B 19/416* (2006.01)
*G05B 19/042* (2006.01)
*G06F 9/54* (2006.01)

(52) U.S. Cl.
CPC ....... *G05B 19/416* (2013.01); *G05B 19/0426* (2013.01); *G06F 9/547* (2013.01); *G05B 2219/25006* (2013.01); *G05B 2219/25312* (2013.01); *G05B 2219/45006* (2013.01)

(58) Field of Classification Search
CPC .............. G05B 19/416; G05B 19/0426; G05B 2219/25312; G05B 2219/25006; G05B 2219/45006; G06F 9/547
See application file for complete search history.

(56) References Cited

U.S. PATENT DOCUMENTS

| | | | | |
|---|---|---|---|---|
| 5,954,089 A * | 9/1999 | Seymour | ............. | F16K 31/0675 137/487.5 |
| 6,308,895 B1 * | 10/2001 | Atxa | .................. | G05D 23/1925 137/335 |
| 6,799,195 B1 * | 9/2004 | Thibault | .......... | G05B 19/41835 700/4 |
| 2008/0078973 A1 * | 4/2008 | Richards | ................. | E03B 7/071 251/315.1 |
| 2011/0153074 A1 * | 6/2011 | Kim | ....................... | B25J 9/1605 700/245 |
| 2014/0107810 A1 * | 4/2014 | Johnson | ............... | G05B 19/042 700/19 |
| 2015/0311749 A1 * | 10/2015 | Frampton | ............... | H02J 9/066 307/65 |
| 2018/0238575 A1 * | 8/2018 | Park | ....................... | F24F 3/044 |
| 2018/0239371 A1 * | 8/2018 | Drees | ....................... | F24F 11/58 |

FOREIGN PATENT DOCUMENTS

| | | |
|---|---|---|
| DE | 10145586 | 4/2002 |
| EP | 1901145 | 3/2008 |

* cited by examiner

*Primary Examiner* — Thomas C Lee
*Assistant Examiner* — Michael Tang
(74) *Attorney, Agent, or Firm* — Hoffmann & Baron, LLP

(57) ABSTRACT

A valve control device, which is designed as a valve control head and/or as a valve position regulator head, for controlling a valve drive and/or a fitting. The valve control device includes a control unit for interacting with a functional unit, which is designed as an actuator unit, sensor unit, signal unit and/or communication unit, wherein the control unit has a device driver for interacting with the functional unit, wherein the device driver provides a software interface, which can be addressed by an application program which can be run on the control unit and/or a remote procedure call, in order to effect an interaction with the functional unit.

12 Claims, 2 Drawing Sheets

VALVE CONTROL DEVICE AND SYSTEM

BACKGROUND OF THE INVENTION

The invention relates to a valve control device, which is designed as a valve control head and/or as a valve position regulator head, for controlling a valve drive and/or a fitting, comprising a control unit for interacting with a functional unit, which is designed as an actuator unit, sensor unit, signal unit and/or communications unit.

The valve control device receives, for example by means of a communication connection, in particular a fieldbus, control signals, which are provided to the control unit. Expediently, control signals are then generated by means of a program running on the control unit, which control signals are provided at an output of the control unit, in order to control the functional unit in accordance with the received control signals. For example, with the control signals an actuator unit designed as an electro-pneumatic converter is controlled, by means of which the valve drive and finally the fitting are then in turn actuated.

The control unit typically comprises a micro-controller. Conventionally, the program running on the control unit has direct access to the hardware, in particular the output of the control unit, in order to provide at the output the control signals required for controlling the functional unit.

SUMMARY OF THE INVENTION

An object of the invention consists in modifying the valve control device such that it can be used more easily and more flexibly.

The object is solved by the features of the present invention. According to the present invention, the control unit has a device driver for interacting with the functional unit, wherein the device driver provides a software interface, which can be addressed by an application program which can be run on the control unit and/or by a remote procedure call, in order to effect an interaction with the functional unit.

Since the control unit is equipped with the device driver, it is easily possible to use the device driver present in the control unit for controlling the functional unit; i.e., it is no longer necessary, in the application program or in the remote procedure call to define the control of the functional unit at the hardware level. This makes it easier to create and to provide different application programs or calls of a remote procedure, since a knowledge or taking into account of hardware-related program instructions is not required for the control of the functional unit. For this reason, the valve control device can be used more easily and more flexibly.

Furthermore, through the provision of the device driver it becomes possible for the application program to function not only with a very specific functional unit, for example a specific type of actuator unit, but rather for a certain range of different functional units, for example, different actuator units, in particular different electro-pneumatic converters. The differences in the control of the different functional units are then taken into account by a corresponding device driver; i.e., depending on the functional unit used, the device driver can implement one and the same instruction of the application program in different controls on the hardware level or control signals and thus ensure the compatibility with different functional units, without having to take these into account in the application program itself.

Advantageous further developments are the subject matter of the dependent claims.

Preferably, the functional unit is apart from the control unit. The functional unit is therefore, in particular not a sub-unit of the control unit, but rather is an independent unit provided in addition to the control unit. For example, the control unit is a micro-controller and the functional unit is a unit provided in addition to the micro-controller. The device driver of the control unit is, therefore, designed in particular for the control or interaction with a (relative to the control unit) external unit.

Preferably, the control unit is designed to provide a virtual run-time environment, in particular, a virtual machine, for executing an/the application program addressing in particular the software interface. Since the application program can be run within a virtual run-time environment, it is possible to provide the application program as hardware-neutral as possible. Expediently, the application program can thus also be run on different control units.

Expediently, the control unit is designed to run an application program present on the control unit in source code, in particular, in a scripting language, and/or in bytecode, addressing in particular the software interface. If the application program is in source code, then it can be particularly easily adapted for specific applications, whereby the valve control device can be used very flexibly overall.

Preferably, the control unit has an interpreter for running an/the application program and/or a compiler for compiling an/the application program. The control unit is thus able to run an application program provided in source code.

Preferably, the device is implemented in a first programming language and an/the application program executable on the control unit is implemented in a second programming language different from the first programming language. For example, the device driver is written in a compiled programming language, for example, C or C++, and the application program is written in a non-compiled programming language, for example, Lua.

Preferably, the control unit has a model, which describes the device driver and/or states of the functional unit and/or a process valve comprising the valve control device, and is designed to provide the model to the/an application program executable on the control unit and/or to an external controller. Expediently, the application program and/or the external controller is designed to address the device driver taking into account the model provided. The application program or the external controller can thus take into account specific properties of the device driver and/or states of the functional unit and/or of the process valve. For example, the application program and/or the external controller can be made aware by means of the model that specific controls of the functional unit are not supported, and can then omit the commands associated with these controls or replace them with other commands.

Preferably, the model has an executable program module, in particular a test procedure. Expediently, the program module, in particular, the test procedure, can be executed by the control unit and/or the external controller, in order to carry out a test or a check of the functionality of the functional unit.

Preferably, the control unit is designed to capture a current program state of an/the application program executed on the control unit and to provide the captured program state to an external controller and/or to a further valve control device. The valve control device can thus, in case of a failure, transfer its current state to a further, for example redundant, valve control device, so that the latter can continue the operation of the valve control device.

Preferably, the control unit is designed to receive a captured current program state of an application program executed on a further valve control device and to execute the application program according to the captured program state itself. The control unit can thus in particular be used as a redundant valve control device, which, in case of a failure of another valve control device, can continue the operation of the another valve control device.

Expediently, the control unit is designed to selectively execute a first or a second application program, wherein the second application program provides a different function, in particular a different regulator and/or control function for controlling the valve drive and/or the fitting than the first application program. The regulator function may e.g. be a closed-loop control function and/or the control function may e.g. be an open-loop control function. By means of the software of the control unit, different functions can thus be given to the valve control device as required—in particular with the same hardware. For example, the valve control device can be operated by the selection of the application program as a pure controller, in particular an open-loop controller, (e.g. as a valve control head), for example in a basic version, or as a regulator, in particular an closed-loop controller, (e.g. as a valve position regulator head), for example by means of the selection of the appropriate application program.

The invention further relates to a system, comprising a first valve control device according to the present invention, an external controller and/or a second valve control device according to the present invention. Expediently, the first valve control device and the external controller and/or the second valve control device are designed to execute the application program. Thus, the first valve control device and the external controller can execute the same application program and/or the first valve control device and the second valve control device can execute the same application program. In the latter case, in particular, the functional unit controlled by the control unit of the first valve control device differs from the functional unit controlled by the control unit of the second valve control device. One and the same application program can thus be used with different hardware, in particular, different functional units.

Preferably, the external controller and/or the second valve control device is designed to address the software interface of the device driver of the first valve control device by means of a remote procedure call, in order to effect an interaction with the functional unit of the first valve control device. Thus, an application program running on the valve control device is not absolutely necessary, in order to address the device driver.

Expediently, the external controller has a first application program and a second application program different from the first application program and is designed to selectively provide the first application program or the second application program and/or to selectively transmit a remote procedure call to the first valve control device according to the first application program or according to the second application program. In this way, the function of the valve control device can be set by means of the external controller, so that the valve control device can be used very flexibly.

BRIEF DESCRIPTION OF THE DRAWINGS

Exemplary embodiments as well as further exemplary details are explained below with reference to the drawing.

DETAILED DESCRIPTION

Figure 1:
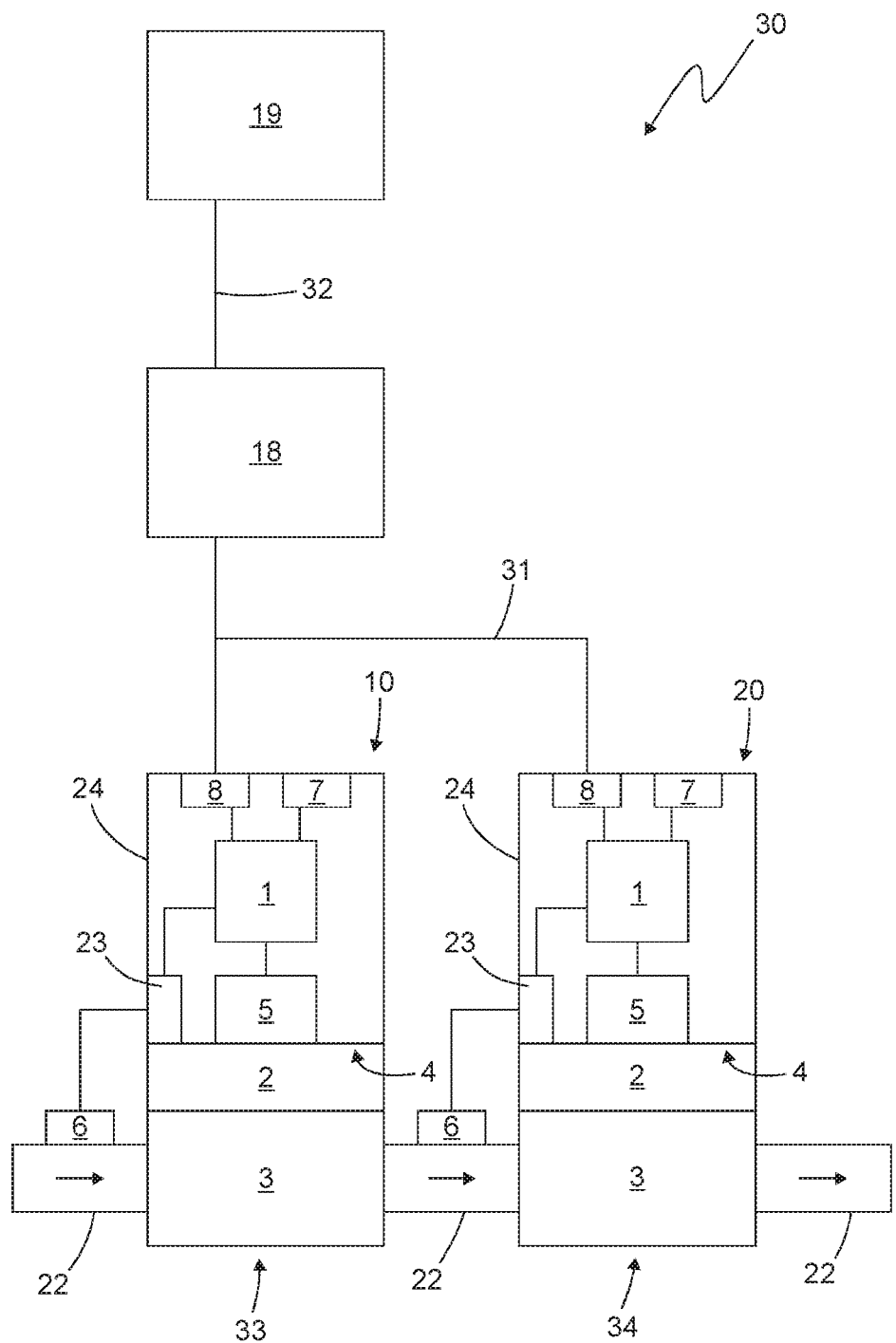
FIG. 1 shows a block diagram of a system of two valve control devices, valve drives, fittings, a process fluid channel and external controllers.

FIG. 1 shows a system 30 having a first valve control device 10 and a second valve control device 20. The system 30 is an exemplary operating environment for the valve control device 10, which already taken on its own represents a possible embodiment. The following explanation related to the first valve control device 10 serves expediently correspondingly also for the second valve control device 20.

The valve control device 10 is designed as a valve control head and/or valve position regulator head and serves to control a valve drive 2 and comprises a control unit 1 for interacting with a functional unit. The functional unit comprises an actuator unit 5, sensor unit 6, signal unit 7 and/or communication unit 8.

Figure 2:
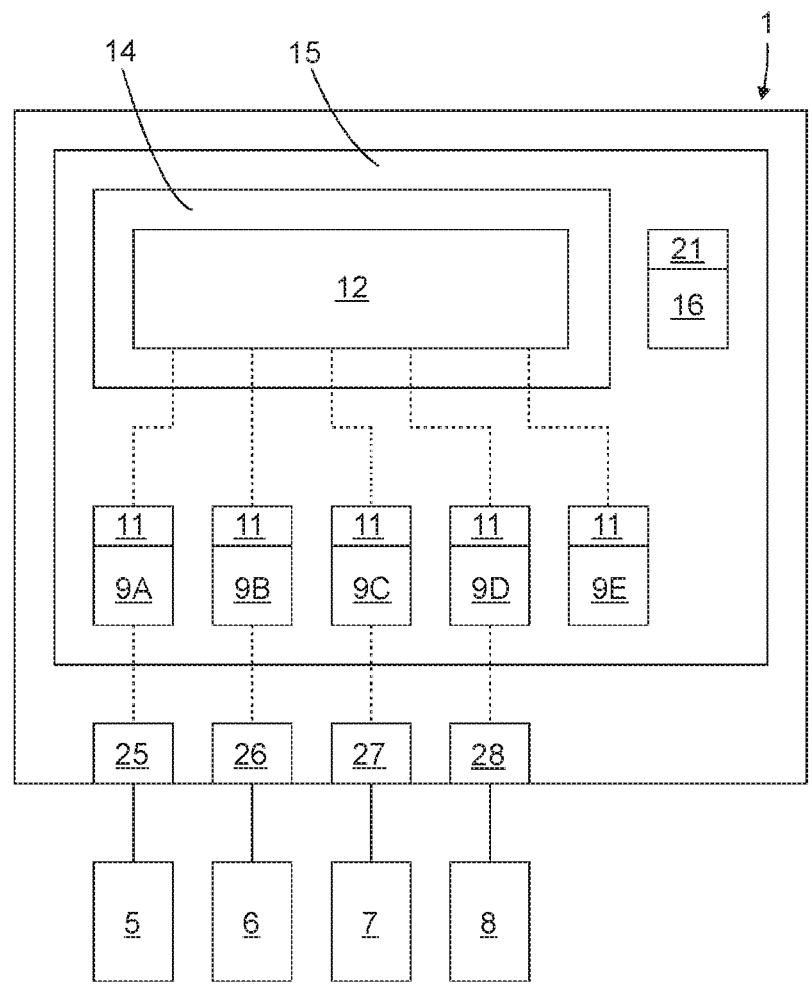
FIG. 2 shows a block diagram of a control unit and connected functional units.

The control unit 1 has a device driver 9A for interacting with the functional unit. In FIG. 2, the control unit exemplarily has a plurality of device drivers 9A, 9B, 9C, 9D, 9E. Alternatively, the control unit 1 can also have only one or a subset of the device drivers 9A to 9E. The explanation below related to the device driver 9A also applies correspondingly to the device drivers 9B, 9C, 9D, 9E. The device driver 9A provides a software interface 11, which can be addressed by an application program 12 executable on the control unit 1 and/or by a remote procedure call, in order to effect an interaction with the functional unit.

Since the control unit 1 is equipped with the device driver 9A, the first valve control device 10 becomes easier and more flexible to use. In order to control the functional unit, the application program 12 or the remote procedure call can easily access the device driver 9A present in the control unit 1 and does not itself have to have the hardware-level program instructions required for the control of the functional unit. The programming or control of the valve control device 10 can thus be done with significantly less effort, so that the valve control device 10 can be used more easily and more flexibly overall.

Exemplary details of the valve control device 10, 20 of the system 30 and the components thereof are explained below. First in regard to the system 30:

The system 30 has a first process valve 33 and a second process valve 34. The system 30 can alternatively also have only one process valve or more than two process valves. Each process valve 33, 34 comprises a valve control device 10 or 20, a valve drive 2 and a fitting 3.

The system 30 exemplarily has a first external controller 18, which is connected to the valve control heads 10, 20 via a first communication connection 31, preferably a bus, in particular a fieldbus, and/or IO-link. Exemplarily, the first external controller 18 is designed as a superordinate controller, a programmable logic controller, PLC, and/or communication gateway.

Exemplarily, the system 30 also has a second external controller 19, which is connected to the first external controller 18 via a second communication connection 32, for example a network connection, in particular a wide area network, in particular the Internet. Alternatively to the embodiment shown, the second external controller 19 can also be directly connected—i.e. not via the first external controller 18—to the valve control heads 10, 20. The second external controller 19 is e.g. designed as a server, in particular as a cloud-server.

Exemplarily, the system 30 also has a process fluid channel 22, through which a process fluid flows. The process fluid channel 22 runs through at least one fitting 3, exemplarily through both fittings 3.

The process valves 33, 34 are described in more detail below. The explanation of the first process valve 33 expediently applies also correspondingly to the second process valve 34.

In the fitting 3 of the process valve 33, a valve member is provided, with which the flow of the process fluid can be influenced. For example, the fitting 3 is designed to move the valve member into a blocking position, an open position and/or one or more further, in particular arbitrary positions between the blocking position and the open position.

The fitting 3 is actuated by a valve drive 2. Expediently, the valve drive 2 provides a mechanical force to move the valve member into a desired position and/or to keep it in a desired position. The valve drive 2 is in particular a fluidic, preferably, a pneumatic valve drive. For example, the valve drive 2 has one or two pressure chambers, which can be selectively subjected to a pressurized fluid, in order to provide the mechanical force required for the actuation of the valve member.

The actuation of the valve drive 2 is effected by the valve control device 10. Expediently, the valve control device 10 has an actuator unit 5 designed exemplarily as an electro-fluidic converter, in particular, as an electro-pneumatic converter, with which the valve drive 2 can be actuated, by subjecting the valve drive 2, for example, to the pressurized fluid. The actuator unit 5 expediently has one or two, in particular electrically actuated, pilot control valves, by means of which the valve drive 2 can be subjected to the pressurized fluid, in order to achieve the desired actuation of the valve drive 2 or of the fitting 3. Expediently, the actuator unit 5 has four or more electrically actuated pilot control valves, in particular in case the valve control device is designed as a valve position regulator head.

Alternatively to the embodiment described above, the actuation of the fitting 3 can also be effected via an electrical drive. The electrical drive can be integrated into the valve control device 10 or can be provided in addition to the valve control device 10. The electrical drive can expediently be controlled by the control unit 1 and thus also constitute a functional unit which can be addressed via the device driver and/or can constitute the actuator 5. If the electrical drive is integrated into the valve control device 10, then the valve control device 10 can be placed directly—i.e. without the valve drive 2—on the fitting 3 and/or be fastened to the latter.

The following explanation is primarily directed to the case, in which the process valve 33 comprises a fluidically actuated valve drive 2, but applies correspondingly also to the case mentioned above, in which instead of the fluidically actuated valve drive 2 an electrical drive is present.

The valve control device 10 is explained in more detail below.

The valve control device 10 is basically designed to carry out a regulation and/or a control of the fitting 3 and/or of the process fluid flowing through the fitting 3. For this purpose, the valve control device 10 expediently has an appropriate control- and/or regulator model. The valve control device 10 can be designed in particular to carry out either only a control (e.g., as a valve control head) or only a regulation (e.g., as a valve position regulator head); i.e., the valve control device 10 can be designed in the cybernetic sense as a controller (e.g. an open-loop controller) or as a regulator (e.g. an closed-loop controller). If the valve control device 10 is designed as a valve position regulator head, it can also be referred to as a positioner.

The valve control device 10 exemplarily has a housing 24. The housing 24 is preferably cylindrically shaped. Exemplarily, a mechanical interface 4 is present on the housing, with which the valve control device 10 can be attached to the valve drive 2. Furthermore, the valve control device 10 can also be equipped with a mechanical interface, with which it can be attached to the fitting 3, for example, in the case, in which the valve control device 10 has an electrical drive for actuating the fitting 3 and the valve drive 2 is not required.

The control unit 1 is arranged in particular in the housing 24. Furthermore, one or several, preferably, all of the functional units—i.e. the actuator unit 5, the sensor unit 6, the signal unit 7, and the communication unit 8—can be arranged in or on the housing. In FIG. 1 the sensor unit 6 is arranged exemplarily outside of the housing 24, while the actuator unit 5, the signal unit 7 and the communication unit 8 are arranged in or on the housing 24.

The first valve control device 10 preferably has the functional units shown in FIG. 1. Alternatively, the first valve control device 10 can also have more or less, in particular, also only one functional unit.

Expediently, one or several, in particular all functional units—exemplarily the actuator unit 5, the sensor unit 6, the signal unit 7 and/or the communication unit 8—is apart from the control unit 1, meaning is present in addition to the control unit 1. The functional unit is thus not a part of the control unit 1, but rather a separate device from the control unit 1. For example, the control unit 1 is designed as a micro-controller and the functional unit, expediently several or all of the functional units, are present in addition to the micro-controller or are arranged remote from the micro-controller.

Exemplary embodiments of the functional units are presented below.

The actuator unit 5 is designed, as already explained above, in particular as an electro-pneumatic converter or as an electrical drive. Electro-pneumatic converters are also referred to as I/P converters. Expediently, the actuator unit 5 is designed to provide a pneumatic signal in accordance with a control of the control unit 1. The actuator unit 5 is preferably part of the valve control device 10, but can also be provided outside of the valve control device 10.

The sensor unit 6 is, for example, a pressure sensor, a flow sensor, a temperature sensor and/or a position sensor. The sensor unit 6 can be part of the valve control device 10 and, for example, can be arranged within the housing 24, or alternatively, can be provided outside of it and thus, in particular in addition to the valve control device 10. The valve control device 10 can exemplarily have a sensor interface 23, to which the sensor unit 6 can be connected. The sensor interface 23 comprises, in particular, a connection for the sensor unit 6. Furthermore, the sensor interface 6 can also constitute a functional unit, with which the control unit 1 can interact by means of an appropriate device driver. For example, the sensor interface can have an A/D converter and/or a D/A converter, with which the control unit 1 can interact by means of an appropriate device driver.

The signal unit 7 is exemplarily arranged on the housing 24 and serves, in particular, to output a visual and/or acoustic signal. For example, the signal unit 7 has an LED and/or a loudspeaker. The signal unit comprises, for example, a graphic display, in particular an LCD display.

The communication unit 8 is expediently designed for communication with an external unit—for example, the external controller 18 or 19 or the further valve control device 20. For example, the communication unit 8 serves to convert signals from/to the control unit 1 into signals from/to the first communication connection 31. For example, the communication unit 8 is a bus interface, in particular a fieldbus interface, and/or an IO link-interface. Exemplarily, the communication unit 8 can comprise a modem.

The control unit 1, in particular the software architecture of the control unit 1, is explained in more detail below with reference to FIG. 2.

The control unit 1 has one or several connections, for example analog and/or digital inputs and/or outputs, by means of which the interaction with the one or several functional units takes place. In the example shown, the control unit 1 has an actuator connection 25, which is communicatively coupled with the actuator unit 5, a sensor connection 26, which is communicatively coupled with the sensor unit 6, a signal connection 27, which is communicatively coupled with the signal unit 7 and a communication connection 28, which is communicatively coupled with the communication unit 8. The communication or interaction of the control unit 1 takes place via the connections 25 to 28, as explained in detail below, by means of the device drivers 9A to 9D. The explanations below relating to the device driver 9A also thereby apply correspondingly to the device drivers 9B to 9D or 9E.

The control unit 1 has a basic program 15, with which the device driver 9A is provided. The basic program 15 can also be referred to as an operating system. Expediently, the basic program runs directly on the hardware of the control unit 1. The basic program 15 exists in particular in machine language or as compiled code. The basic program 15 can, for example, be programmed in the programming language C or in a programming language based on C, such as C++.

Exemplarily, the basic program 15 has access to the hardware of the control unit 1, in particular to the connections 25 to 28.

The device driver 9A is expediently implemented in machine language and can directly access its assigned connection—here the actuator connection 5. The device driver 9A is, for example, designed as a program module; that means that the device driver 9A can be added to the control unit 1 and/or can be removed from the control unit 1. Expediently, the device driver 9A can be added and/or removed by means of the basic program 15.

The device driver 9A provides a software interface 11, which can be addressed by the application program 12 and/or by a remote procedure call explained below.

For example, the software interface 11 defines one or several commands, which can be called by the application program 12 and/or the remote procedure call. Expediently, an appropriate control of the hardware assigned to the device driver 9A—for example, the connection 25—is defined in the device driver 9A for each of the defined commands. In the device driver 9A in particular also the actuator unit 5 provided exemplarily outside the control unit 1 as well as in particular also the valve drive 2 and/or the fitting 3 is taken into account; i.e., in principle, information about the assigned functional unit can also be contained in the device driver 9A. For example, the device driver 9A takes into account the dependency of the position of the fitting 3 on the control provided to the actuator unit 5 or on the control signals provided by the actuator connection 25.

Expediently, the software interface 11 defines a first command to open the fitting 3. A control—expediently the machine code to be executed—is assigned in the device driver 9A to this first command, with which an opening of the fitting is effected taking into account the actuator connection 25, the valve drive 2 and the fitting 3. The software interface 11 can define a plurality of further commands—for example, a command to close the fitting 3, a command to move the fitting into a position defined by an assignable parameter and/or a command to control and/or regulate the process fluid to a specific pressure and/or flow.

The device driver 9B takes into account in particular properties of the sensor interface 23 and/or of the sensor unit 6. Expediently, the software interface 11 of the device driver 9B defines a command for reading the sensor unit 6 and/or the sensor interface 23.

The device driver 9C takes into account in particular properties of the signal unit 7, for example, the dependency between the signals output at the signal connection 27 and signals provided by the signal unit 7. The software interface 11 of the device driver 9C expediently has a command for outputting a signal.

The device driver 9D takes into account in particular properties of the communication unit 8, for example, the dependency between signals received or sent by the communication unit 8 and signals output or received at the communication connection 28. The software interface 11 of the device driver 9D expediently has a command for detecting a signal and/or a command for outputting a signal to an external controller 18, 19 and/or the second valve control device 20.

The device driver 9E, which has not yet been discussed above in detail, is expediently an internal functional unit of the control unit 1, for example, an internal sensor, for example, a temperature sensor, and/or an internal A/D converter and/or an internal D/A converter. The software interface 11 expediently comprises commands for controlling the internal functional unit.

The application program 12 will be discussed in more detail below. Expediently, the application program 12 is implemented in a different programming language than the device driver 9A and/or the basic program 15. For example, the application program 12 is programmed in a scripting language, in particular in Lua. Preferably, the application program 12 is in source code or in bytecode.

The application program 12 expediently has no direct access to the hardware of the control unit 1, but rather has to access in particular the device drivers 9A to 9E and/or the basic program 15 for this.

The basic function of the valve control device 10 can be defined in particular by means of the application program 12. For example, the application program 12 can be designed to provide a control function, with which on the basis of a received signal the fitting 3 can be moved into a specific position. Expediently, the application program 12 comprises a command for addressing the software interface 11 of the device driver 9D, in order to control the communication connection 28 such that a control signal can be received by the communication unit 8. Exemplarily, the application program 12 also comprises a command, in order to call up a command of the software interface 11 of the device driver 9A based on the control signal received, in order to control the actuator connection 25 such that by means of the actuator unit 5 and the valve drive 2 the fitting 3 or the valve member of the fitting 3 assumes the specific position. By using such an application program 12 the valve control device 10 expediently assumes the function of a controller in the cybernetic sense, e.g. the function of an open-loop controller.

Alternatively or additionally the control unit 1 can also comprise another application program, with which the valve control device 10 assumes the function of a regulator in the cybernetic sense, e.g. the function of a closed-loop controller. This other application program can comprise a command for addressing the software interface 11 of the device driver 9B in addition to commands for addressing the software interface 11 of the device driver 9A and 9D, in order to bring it about via an appropriate control of the sensor connection 26, that a sensor signal detected by the sensor unit 6 is received. Furthermore, the application program can be designed to take into account the detected sensor signal when controlling the actuator unit 5 (by means of the device driver 9A).

The control unit 1 is accordingly preferably designed to selectively run a first or a second application program, wherein the second application program provides a different function, in particular, a regulator- and/or control function for controlling the valve drive 2 and/or the fitting 3, than the first application program. As mentioned above, the first application program can provide a pure control function—e.g. an open-loop control function—and the second application program can provide a regulator function—e.g. an closed-loop control function.

Expediently, the first and/or the second application program can be stored initially in the external controller 18 and/or 19 and can be provided from there to the valve control device 10, e.g. can be transmitted to the valve control device 10. Expediently, the provision of an application program to the valve control device 10 can take place on the basis of an unlock signal received from the external controller 18 or 19.

Furthermore, with the application program 12 a diagnostic function can be provided, which, for example, interacts with the sensor unit 6 via the device driver 9B.

In order to execute the application program 12 the control unit 1 exemplarily has a run-time environment. The run-time environment is provided, for example, by the basic program 15. The run-time environment is in particular a virtual run-time environment 14, for example a virtual machine, in particular a Lua VM. A virtual run-time environment should be understood in this connection to mean in particular a run-time environment, in which the application program to be executed has no direct access to the hardware of the control unit 1, but rather for the hardware access has to access other program—for example, the device drivers 9A to 9E. Furthermore, a virtual run-time environment is understood to mean in particular a run-time environment, in which the basic program 15 providing the run-time environment can pause or freeze and can store or capture and in particular also export the application program in the paused state with its state variables. This can be used in particular in the operation of the valve control device 20 described below as a backup valve control device.

For example, the first valve control device 10 and the second valve control device 20, in particular in the constellation shown in FIG. 1—where the same process fluid channel runs through the process valves 33, 34—can be operated redundantly in respect to each other, so that the second process valve 34 serves as a backup for the first process valve 33.

Expediently, an external controller 18, 19 and/or the first valve control device 10 and/or the second valve control device is designed to monitor the state of the first process valve 33. If a malfunction of the first process valve 33 is thereby detected, then it can be brought about (for example by an appropriate control signal of the external controller 18, 19 and/or the first valve control device 10 and/or the second valve control device 20), that the control unit 1 of the first valve control device 10 captures the current program state of the application program executed on the control unit 1 of the first valve control device 10 and provides the captured program state to the second valve control device 20—for example, directly or by means of one of the external controllers 18, 19. Expediently, the first valve control device 10 stops the execution of the application program 12 and the second valve control device 10 continues an application program, based on the transmitted program state. Expediently, in addition to the program state the application program 12 is also provided to the second valve control device 20. In this way, the second valve control device 20 can fill in as backup for the first valve control device 10, in order to ensure the correct control/regulation of the process fluid flowing through the process fluid channel even when the first valve control device 10 or the first process valve 33 fails.

Exemplarily, the control unit 1 has an interpreter for executing the application program 12 and/or a compiler for compiling the application program 12 before it is executed. The interpreter and/or compiler can be provided by the basic program 15. For example, the execution of the application program 12, of the interpreter and/or of the compiler takes place in a/the virtual machine.

Furthermore, the control unit 1 exemplarily has a model 16 describing the device driver 9A. The model 16 describes, for example, the callable commands of the device driver 9A and/or the actions of the assigned functional unit that can be effected with the commands. Furthermore, the model 16 can describe states of the functional unit and/or states of the process valve 33. The control unit 1 is preferably designed to provide the model 16 to the application program 12. Expediently, the application program 12 is designed to access the model 16 and take it into account during the interaction with the device driver 9A. For example, the application program 12 can be designed, to call up a command of the software interface 11 of the device driver 9A based on the model 16.

Furthermore, the control unit can be designed to provide the model 16 to the first external controller 18 and/or second external controller 19. For example, the first controller 18 and/or the second controller 19 is designed to transmit a model request to the valve control device 10 and the control unit 1 is designed to transmit the model 16 in response to the model request to the first external controller 18 and/or the second external controller 19. This can take place in particular in connection with the remote procedure call explained below.

The model 16 can be used in one of the external controllers 18, 19 and/or the control unit 1 in particular as a virtual model of the process valve 33 and can be used during the controlling. For example, the current state of the process valve 33 can be documented or represented by means of the model 16.

Expediently, a separate model 16 can be provided for each device driver 9A to 9E. Alternatively or additionally a model can also exist which describes several or all device drivers of the control unit 1.

The device driver 16 exemplarily comprises an executable program module 21. The program module 21 can, for example, be executed by the application program 12 and/or an external controller 18, 19. Expediently, the program module 21 is a test procedure, in particular, for testing one or several of the device drivers 9A to 9E or one or several associated functional units. For example, the test procedure comprises a command for actuating the actuator unit 5 and/or a command for detecting a sensor signal from the sensor unit 6.

Alternatively or in addition to the embodiment of the control unit 1 discussed above, in which the software interfaces 11 of the device drivers 9A to 9E are addressed by the application program 12 executed on the control unit 1, it is also possible, that the control unit 1 is designed to receive from the external controller 18 and/or 19 a remote procedure call and to address a software interface 11 of one of the device drivers 9A to 9E based on the remote procedure call.

In this case, the application program 12 on the control unit 1 can be dispensed with; i.e., the control unit 1 can in this case also have no application program 12.

Expediently, the external controller 18 and/or 19 and/or the second valve control device 20 are designed to address the software interface 11 of the device driver 9A of the first valve control device 10 by means of a remote procedure call, in order to effect a control of a functional unit of the first valve control device 10.

Preferably, the application program 12 is thereby present on the external controller 18 and/or 19 and/or the second valve control device 20, and the instructions of the application program 12 are transmitted step by step to the control unit 1 of the first valve control device 10 for the execution. Expediently, the external controller 18 and/or 19 thereby has a virtual run-time environment, in particular, a virtual machine, on which the application program 12 is executed. The application program 12 can thereby be executed in particular in the cloud and/or a communication gateway or a programmable logic controller. In this way, in particular an update and/or change of the application program 12 can be facilitated. The communication architecture corresponds, for example, to a client/server model, in which the application program 12 works against a proxy of the real valve control device 10 or of the real process valve 33 or of a functional unit and/or its model 16.

In addition, it is also possible for the application program 12 to be executed on the valve control device 10 and for one of the external controllers 18, 19 to access the application program 12. The external controller 18 or 19 no longer works in this case against the real valve control device 10 or the functional unit, but rather against a virtualised version thereof. Thus, the replacement of the valve control device 10 is facilitated.

Expediently, the same application program can be executed on the first valve control device 10, an external controller 18 or 19 and/or the second valve control device— in particular, for the purpose of the local control of the functional unit and/or for the above mentioned purpose of the control of a remote functional unit by means of the remote procedure call. Preferably, the identical application program 12 can be executed on the two valve control heads 10, 20 and one of the controllers 18, 19.

Preferably, the first valve control device 10 and the second valve control device 20 are designed so that the same application program can be executed on the first valve control device 10 and the second valve control device 20, even when the functional unit addressed by the application program differs in the valve control devices 10, 20. Expediently, the application program 12 thereby comprises in each case a command, with which in the execution in both valve control devices 10, 20 the software interface 11 of the device driver is accessed. While the device driver of the first valve control device 10 now converts this command into a first control, the device driver of the second valve control device converts the (same) command into a different control. In this way, the same application program 12 can also be used in valve control devices 10, 20, with which different functional units are controlled. Expediently, the first valve control device 10 and the second valve control device 20 thereby form part of a respective process valve 33, 34, as shown exemplarily in FIG. 1. Preferably, the first process valve 33 differs from the second process valve 34 in the control unit 1, a functional unit, the actuator unit 5, the valve drive 2 and/or the fitting 3. The one or several differences are taken into account by corresponding device drivers, so that both process valves 33, 34 despite their differences can be operated with the same application program 12.

What is claimed is:

1. A valve control device, which is designed as a valve control head and/or as a valve position regulator head, for controlling a valve drive and/or a fitting, the valve control device comprising a control unit for interacting with a functional unit, which is designed as an actuator unit, sensor unit, signal unit and/or communications unit, wherein the control unit has a device driver for interacting with the functional unit, wherein the device driver provides a software interface, which can be addressed by an application program, which can be run on the control unit, and/or a remote procedure call, in order to effect an interaction with the functional unit, and
    wherein the control unit is designed to provide a virtual run-time environment for executing the application program addressing the software interface, and
    wherein the control unit is designed to capture a current program state of the application program executable on the control unit and to provide the captured program state to an external controller and/or to a further valve control device, and
    wherein the control unit is designed to selectively execute a first or a second application program, wherein the second application program provides a different regulator function and/or control function for controlling the valve drive and/or the fitting than the first application program.

2. The valve control device according to claim 1, wherein the functional unit is apart from the control unit.

3. The valve control device according to claim 1, wherein the control unit is designed to execute an application program present on the control unit in source code, and/or in bytecode, addressing the software interface.

4. The valve control device according to claim 1, wherein the control unit has an interpreter for executing the application program and/or a compiler for compiling the application program.

5. The valve control device according to claim 1, wherein the device driver is implemented in a first programming language and the application program executable on the control unit is implemented in a second programming language different from the first programming language.

6. The valve control device according to claim 1, wherein the control unit has a model, which describes the device driver and/or states of a functional unit and/or a process valve comprising the valve control device, and is designed to provide the model to the application program executable on the control unit and/or to an external controller.

7. The valve control device according to claim 6, wherein the model has an executable test procedure.

8. A system comprising a first valve control device according to claim 1, an external controller and/or a second valve control device according to claim 1.

9. The system according to claim 8, wherein the first valve control device and the external controller are designed to execute the application program and/or the first valve control device and the second valve control device are designed to execute the application program.

10. The system according to claim 8, wherein the external controller and/or the second valve control device are designed to address the software interface of the device driver of the first valve control device by means of a remote procedure call, in order to effect an interaction with the virtual functional unit of the first valve control device.

11. The system according to claim 8, wherein the external controller has a first application program and a second application program different from the first application program and is designed to selectively provide the first application program or the second application program and/or to selectively transmit to the first valve control program a remote procedure call according to the first application program or according to the second application program, wherein the first application program and/or the second application program is designed to address the software interface of the first valve control device.

12. A valve control device, which is designed as a valve control head and/or as a valve position regulator head, for controlling a valve drive and/or a fitting, the valve control device comprising a control unit for interacting with a functional unit, which is designed as an actuator unit, sensor unit, signal unit and/or communications unit, wherein the control unit has a device driver for interacting with the functional unit, wherein the device driver provides a software interface, which can be addressed by an application program, which can be run on the control unit, and/or a remote procedure call, in order to effect an interaction with the functional unit, and wherein the control unit is designed to provide a virtual run-time environment for executing the application program addressing the software interface, and wherein the control unit is designed to receive a captured current program state of an application program executed on a further valve control device and to execute the application program itself according to the captured program state, and wherein the control unit is designed to selectively execute a first or a second application program, wherein the second application program provides a different regulator function and/or control function for controlling the valve drive and/or the fitting than the first application program.

* * * * *